(12) United States Patent
Daylong (10) Patent No.: US 10,272,826 B2
(45) Date of Patent: Apr. 30, 2019

(54) PROGRAMMABLE MULTIPLE PHASE WARNING LIGHT SYSTEM

(71) Applicant: Patrick Lynn Daylong, Lockhart, TX (US)

(72) Inventor: Patrick Lynn Daylong, Lockhart, TX (US)

( * ) Notice: Subject to any disclaimer, the term of this patent is extended or adjusted under 35 U.S.C. 154(b) by 78 days.

(21) Appl. No.: 15/589,388

(22) Filed: May 8, 2017

(65) Prior Publication Data

US 2018/0319326 A1 Nov. 8, 2018

(51) Int. Cl.
| B60Q 1/44 | (2006.01) |
| B60Q 1/26 | (2006.01) |
| F21S 43/20 | (2018.01) |
| F21S 45/10 | (2018.01) |
| F21S 43/14 | (2018.01) |
| H05B 33/08 | (2006.01) |
| H05B 37/02 | (2006.01) |
| F21Y 115/10 | (2016.01) |
| F21Y 113/13 | (2016.01) |

(52) U.S. Cl.
CPC ........... *B60Q 1/444* (2013.01); *B60Q 1/2696* (2013.01); *F21S 43/14* (2018.01); *F21S 43/26* (2018.01); *F21S 45/10* (2018.01); *H05B 33/0842* (2013.01); *H05B 37/029* (2013.01); *H05B 37/0272* (2013.01); *B60Q 2400/20* (2013.01); *F21Y 2113/13* (2016.08); *F21Y 2115/10* (2016.08)

(58) Field of Classification Search
CPC .................................................... B60Q 1/444
See application file for complete search history.

(56) References Cited

U.S. PATENT DOCUMENTS

| 6,535,113 B1 * | 3/2003 | Gravolin | B60Q 11/007 307/10.8 |
| 2003/0097874 A1 * | 5/2003 | Milender | F16D 25/14 73/168 |
| 2005/0237172 A1 * | 10/2005 | Boomershine, III | B60Q 1/44 340/467 |
| 2009/0091440 A1 * | 4/2009 | Roman | B60Q 1/44 340/479 |
| 2017/0259732 A1 * | 9/2017 | Blevins | B60Q 1/302 |

FOREIGN PATENT DOCUMENTS

CN 105818815 A * 8/2016

* cited by examiner

*Primary Examiner* — Charlie Y Peng (57) ABSTRACT

A Programmable Multiple Phase Warning Light System replacing or adding to the high mounted rear stop light on motor vehicles and trailers. Light Emitting Diodes of red, yellow, green and blue illuminate to alert others to the phase of slowing or acceleration the vehicle is in so as to give earlier warning and information to other drivers as to the vehicle's phase of slowing or acceleration. The Programmable Multiple Phase Warning Light System makes direct connection to the vehicle's computer via the vehicle's diagnostic port receiving necessary information that is transmitted via radio waves to the remote receiver/processor to which is connected a printed circuit board to which is plugged LED light arrays of Red LEDs to indicate braking, Yellow LEDs warn of slowing without braking, Green LEDs when accelerating and Blue LEDs when in cruise mode.

1 Claim, 8 Drawing Sheets

FIG. 1

PROGRAMMABLE MULTIPLE PHASE WARNING LIGHT SYSTEM

BACKGROUND OF THE INVENTION

Technical Field

The present invention relates to a Programmable Multiple Phase Warning Light System using radio waves to transmit information from the vehicle's computer to a remote receiver/processor mounted to the rear of a vehicle or trailer; using an array of red, yellow, green and blue LED lights to signal a vehicle's phases of slowing or acceleration.

A vehicle's signals lights are very important for the safety of every person operating a motor vehicle on public roadways as well as for the safety of the passengers in motor vehicles by warning other drivers to the vehicle's mode of movement however; conventional signal lights are limited to being on, off or blinking; therefore the conventional lights cannot signal other very important and useful information that can reduce vehicle accidents and inform other drivers. Conventional signal lights cannot warn that a motor vehicle is slowing without braking. The period between driver removing their foot from the accelerator and the time the brake pedal is pressed can be one second or several seconds and that time is time that can make the difference in other drivers avoiding a serious accident.

The Programmable Multiple Phase Warning Light System can be programmed to warn that the vehicle is slowing without braking, accelerating, in cruise mode, stopping at a normal rate, in a panic stop mode or stopped with a passenger on board.

Background Art

An example is disclosed in U.S. Patent Filed: Oct. 11, 2014 by Nicholas Aaron Lanham, David Louis Edelen titled "Vehicular Sequential LED Ring Warning System" Publication date: May 21, 2015 Publication number: 2015017965 Nicholas Aaron Lanham, David Louis Edelen disclose a Vehicular Sequential LED Ring Warning System is disclosed. This system improves upon existing taillight configurations by providing operators with distinct LED rings that sequential illuminate based upon the vehicle operator's braking intensity. This system will provide all drivers with a significantly more effective method of determining braking intensity. Using a simple and consistent sequence of three LED rings, the Sequential Warning System has the capacity to revolutionize existing brake light warning system design concepts by providing driver's with a decisive illumination pattern that simply replaces the vehicle's brake lights rather than adding a separate set of LED or light bulb arrays, which only increase driver confusion when simultaneously interpreting separate brake light signals.

Another example is described in U.S. Patent filed: Nov. 4, 2014 by David MacArthur Publication date May 14, 2015 Publication number US20150130607A1 discloses an improved vehicle brake light system is provided, in which a transmitter and receiver is used to determine the distance and closing velocity of a trailing vehicle relative to a lead vehicle. The distance and closing velocity are used to determine whether a trailing vehicle may cause a risk of collision upon application of the lead vehicle brakes. If the distance between the trailing vehicle and lead vehicle is deemed below a minimum threshold at a given vehicle speed, the rear brake lights are illuminated. If the closing velocity is a trailing vehicle is deemed above a threshold maximum, the system pulses the rear brake lights of the lead vehicle. This improves communication between a lead vehicle and a trailing vehicle, whereby the trailing vehicle is alerted to cease tailgating activity or alternatively to apply the brakes in order to avoid a potential rear-end collision.

Another example is described in U.S. Pat. No. 8,928,475 B2 filed: Jan. 6, 2015 by Matthew Bement, titled "Progressive Braking Indicator System". Bememt discloses a progressive braking indicator system includes a brake light assembly having multiple lights, a brake pedal for the vehicle, a sensor connected to the brake pedal for measuring a distance the brake pedal has moved and an amount of pressure applied to the brake pedal by a driver of the vehicle, and a brake control processor connected to the sensor and the at least one brake light assembly. The brake control processor is configured to: a) receive the distance and amount of pressure measured by the sensor b) generate a signal based on the distance and amount of pressure measured by the sensor, wherein the signal is configured to illuminate a varying subset of the plurality of lights based on the distance and amount of pressure measured by the sensor. A power source connected to the at least one brake light assembly, the sensor, and the brake control processor.

SUMMARY OF THE INVENTION

The problems mentioned are solved in the present invention in that the Programmable Multiple Phase Warning Light System mounted in place of the conventional high stop light or replacing the vehicle's existing tail light assemblies provides information directly from the vehicle's computer about all phases of acceleration and deceleration. When the vehicle accelerators forward from a stop the Programmable Multiple Phase Warning Light System turns off the red LEDs and illuminates green LEDs that shine most brightly under full throttle. As the throttle is eased up the green LEDs dim until the throttle blade is in a normal cruise phase causing the Programmable Multiple Phase Warning Light System to turn off the green LEDs. When the throttle starts closing without the brakes being engaged the yellow LEDs illuminate in accordance with the state of slowing that the vehicle is in, shining most brightly when the throttle is completely closed. When the brakes are engaged the yellow LEDs will go out and the red LEDs will illuminate at full brightness under normal braking or flash if the brakes are fully engaged in ABS mode. Under light throttle the vehicle may still be slowing so the green LEDs will not shine as the yellow LEDs signal slowing. When the vehicle has the cruise control engaged the Programmable Multiple Phase Warning Light System will illuminate blue LEDs to show that the vehicle's speed will be relatively constant.

The current invention employs further innovation by linking the Multiple Phase Warning Light system to the vehicle's computer via remote control requiring fewer wires running to the rear. The Multiple Phase Warning Light System will require only a positive feed and a ground. Most new vehicle models have computers that monitor all aspects of the vehicle's movement so the Programmable Multiple Phase Warning Light System will plug a transmitter into the computer to read the information needed and transmit the information to the receiver/processor in the Programmable Multiple Phase Warning Light System where the light emitting diodes will be illuminated in accordance with the computer data.

DETAILED DESCRIPTION OF THE PREFERRED EMBODIMENT

Figure 1:
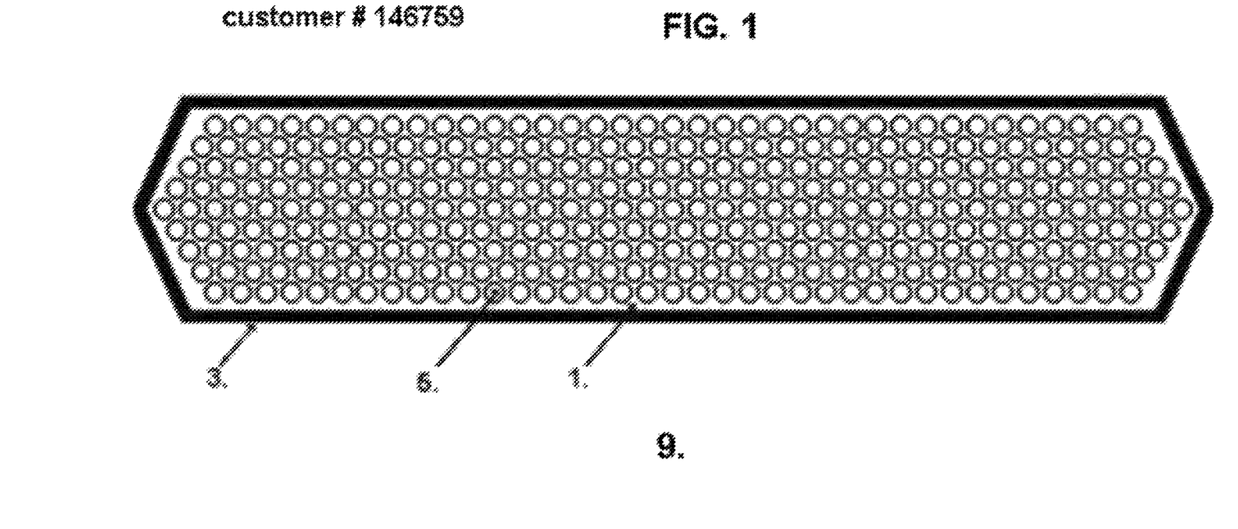
FIG. 1 is a view of the Programmable Multiple Phase Warning Light System as mounted on the rear of a vehicle.
Figure 2:
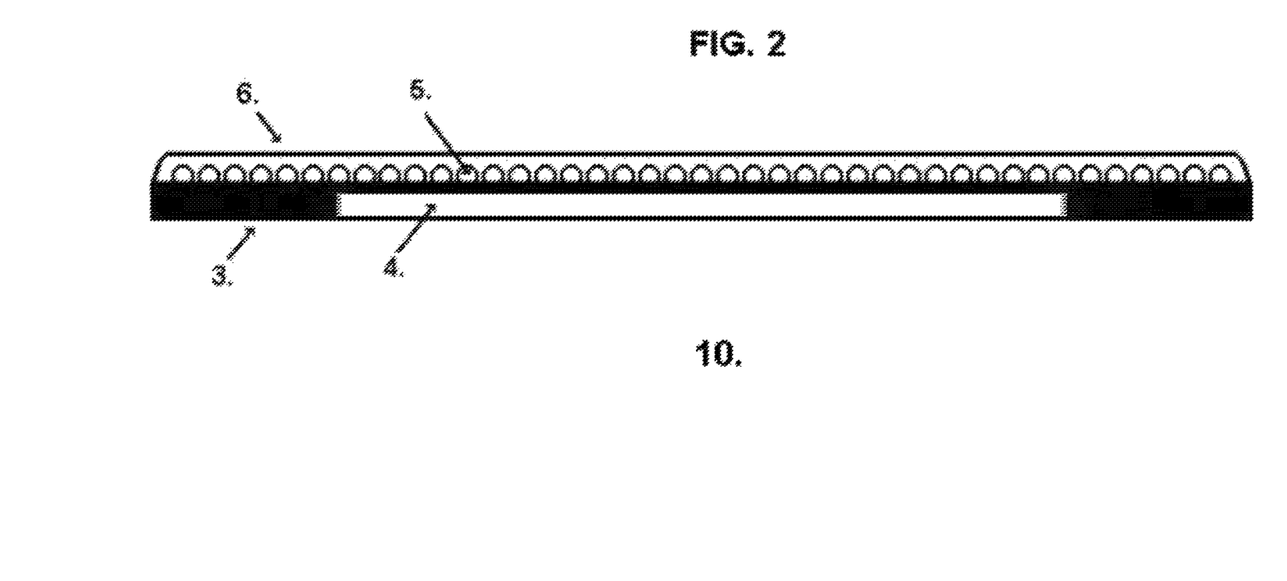
FIG. 2 is a view of Programmable Multiple Phase Warning Light System from a top view as it is mounted on the rear of a vehicle showing the receiver/processor.
Figure 3:
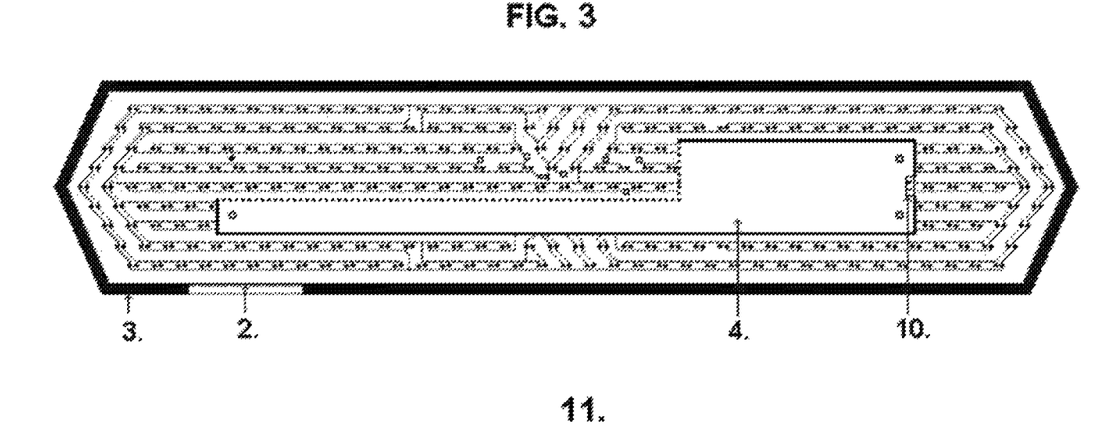
FIG. 3 is a view of the Programmable Multiple Phase Warning Light System from the inside as mounted, showing the housing, a sectioned view of the remote receiver/processor, the printed circuit board and power receptacle.
Figure 4:
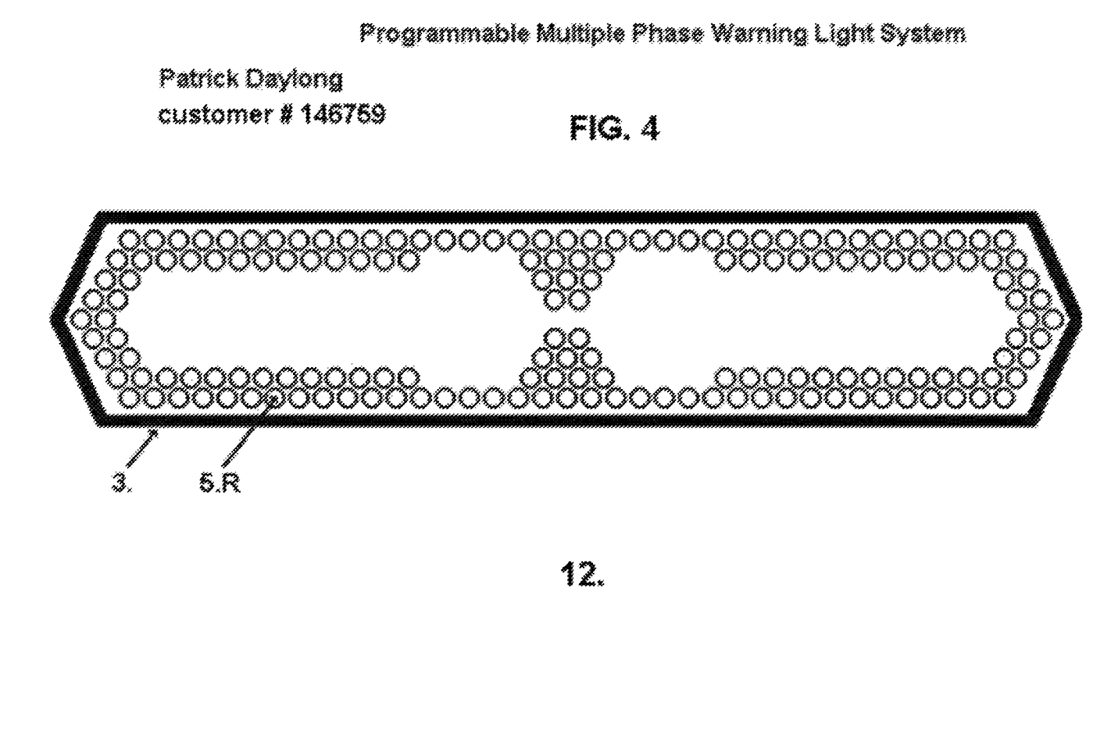
FIG. 4 is a view of the Programmable Multiple Phase Warning Light System from the rear as mounted showing the arrangement of the red LEDS that illuminate when the brake is engaged.
Figure 8:
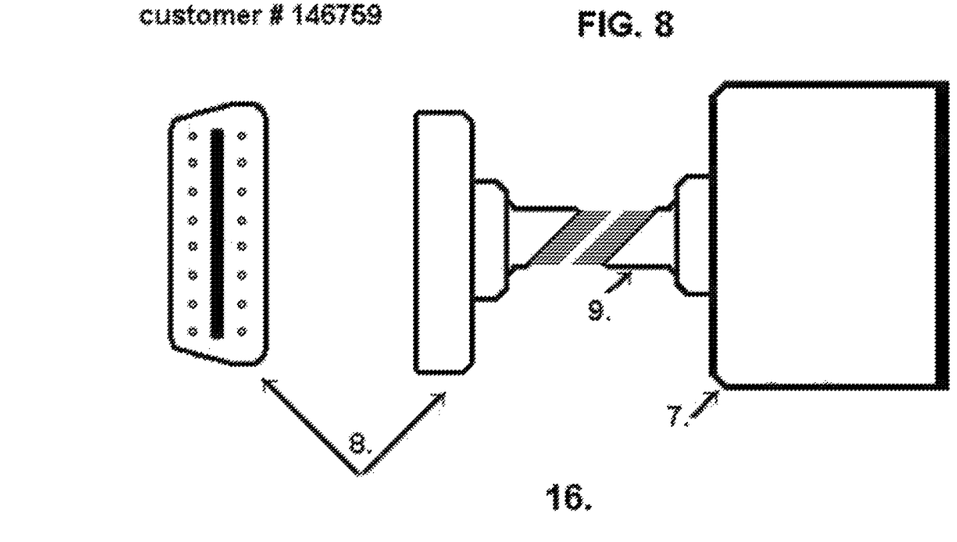
FIG. 8 is a view of the Programmable Multiple Phase Warning Light System's remote transmitter that attaches to the vehicles diagnostic port.

The Programmable Multiple Phase Warning Light System 1 (FIG. 1) consists of a printed circuit board 2 (FIG. 3,9) housing 3 (FIG. 1-7), a remote signal receiver/processor 4 (FIG. 2,3,9), an array of LEDs 5 (FIG. 1,3,4,5,6,7) comprised of four different colors (red 5R, yellow 5Y, green 5G and blue 5B) protected by a clear lens, 6 (FIG. 2) A remote transmitter 7 (FIG. 8,9) that has three parts; the diagnostic port plug 8 (FIG. 8), the transmitter body 7 (FIG. 8) and a 16 wire loom 9 (FIG. 8) from the transmitter body 7 (FIG. 8) to the diagnostic port plug 8 (FIG. 8) that plugs into the vehicle's diagnostic port.

Figure 5:
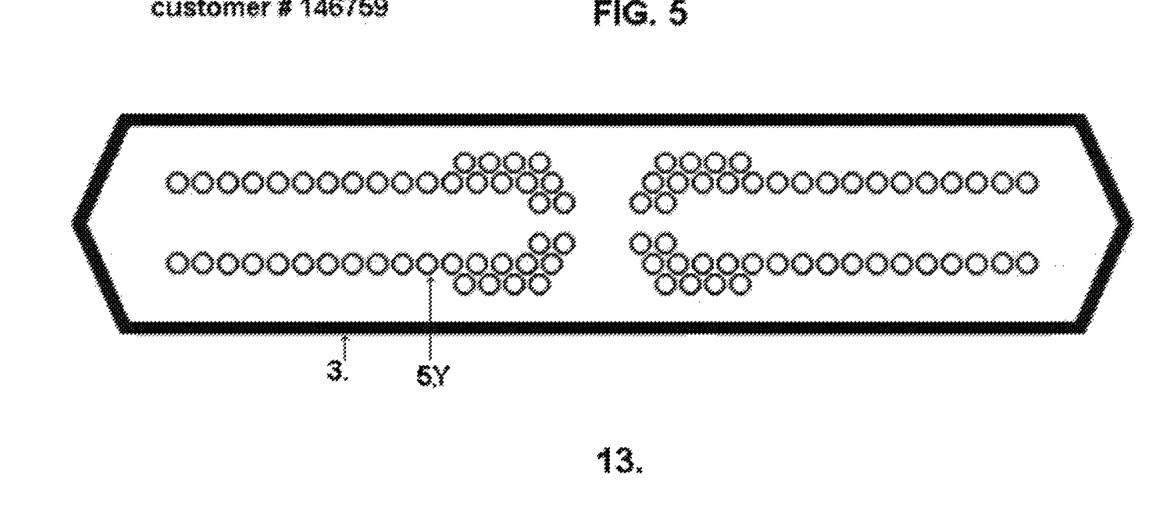
FIG. 5 is a view of the Programmable Multiple Phase Warning Light System from the rear as mounted showing the arrangement of the yellow LEDs that illuminate when the vehicle is slowing without braking/coasting.
Figure 6:
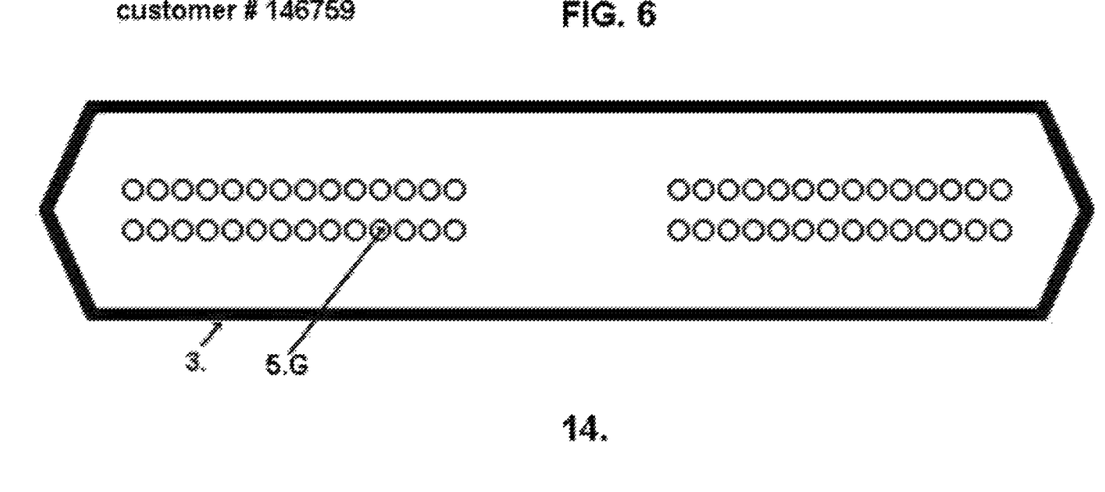
FIG. 6 is a view of the Programmable Multiple Phase Warning Light System from the rear as mounted showing the arrangement of the green LEDs that illuminate when the vehicle is accelerating.
Figure 7:
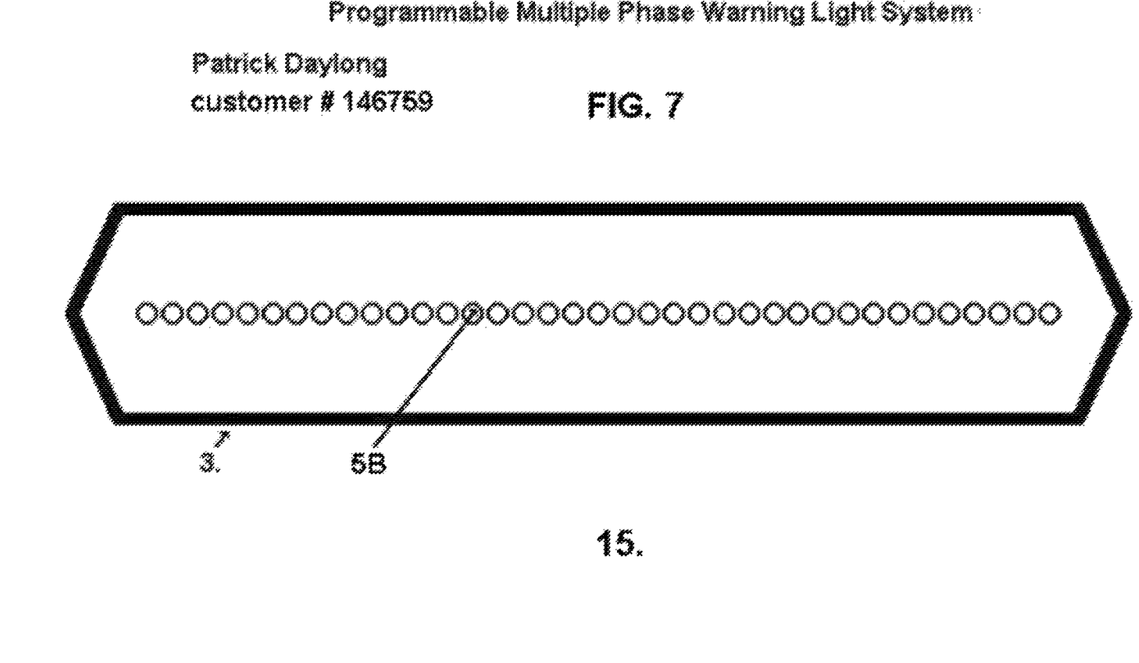
FIG. 7 is a view of the Programmable Multiple Phase Warning Light System from the rear as mounted showing the arrangement of the blue LEDs that illuminate when the vehicle in the cruise mode.

The Programmable Multiple Phase Warning Light Systems remote housing receives power from the vehicle at and is ground though the power receptacle 10 (FIG. 3,9) and is linked to the vehicles computer via the signal transmitter 7 (FIG. 8) that transmits information via radio waves to a signal receiver/processor 4 (FIG. 2) that sends power via a printed circuit board 2 (FIG. 3,9) to illuminate the LEDs 5 (FIG. 2) related to the vehicles phase of acceleration or deceleration so as to warn other drivers that the vehicle is slowing under braking by illuminating the Programmable Multiple Phase Warning Light System's red LEDs 5R (FIG. 4) or slowing while coasting with light or no throttle input by illuminating the Programmable Multiple Phase Warning Light System's yellow LEDs 5Y (FIG. 5). Further signals from the vehicle's computer causes the Programmable Multiple Phase Warning Light System's green LEDs 5G (FIG. 6) to illuminate while the vehicle is accelerating and further information is presented by the Programmable Multiple Phase warning Light System 1 (FIG. 1) by illuminating blue LEDs 5B (FIG. 7) when the vehicle is in cruise mode.

The manufacturing processes and materials used to create the various components of the Programmable Multiple Phase Warning Light System are well known and not claimed as unique but common knowledge.

The above descriptions are those of the preferred embodiment of the invention. Various alterations and changes can be made without departing from the spirit and broader aspects of the invention as defined in the claims, which are to be interpreted in accordance with the principles of patent law, including the doctrine of equivalents. Any reference to an item in the disclosure or to an element in the claim in the singular using the articles "a," "an," "the," or "said" is not to be construed as limiting the item or elements to the singular unless expressly so stated.

The invention claimed is:

1. A programmable multiphase warning light system compromising:
    a housing;
    an array of red LED lights;
    an array of yellow LED lights;
    an array of green LED lights;
    an array of blue LED lights;
    a printed circuit board into which the four arrays of LED lights are plugged;
    a clear protective lens mounted to the housing for protecting the four arrays of LED lights;
    a remote radio wave signal receiver/processor connected to the printed circuit board;
    a programmable radio wave signal transmitter with a connective sixteen-wire loom and a sixteen-pin plug that plugs into a vehicle's diagnostic port to read information from the vehicle's computer;
    wherein the housing receives power from the vehicle and is mounted in the rear of the equipped vehicle in place of the high mounted brake light or in addition to the high mounted brake light for good visibility;
    wherein when the programmable radio wave signal transmitter reads the information from the computer that the vehicle is accelerating, the receiver/processor receives the information from the programmable radio wave signal transmitter and sends power to illuminate the array of green LED lights;
    wherein when the programmable radio wave signal transmitter reads the information from the computer that the vehicle is in cruise mode, the receiver/processor receives the information from the programmable radio wave signal transmitter and sends power to illuminate the array of blue LED lights;
    wherein when the programmable radio wave signal transmitter reads the information from the computer that the vehicle is slowing while coasting with light or no throttle input, the receiver/processor receives the information from the programmable radio wave signal transmitter and sends power to illuminate the array of yellow LED lights;
    wherein when the programmable radio wave signal transmitter reads the information from the computer that the brakes is engaged, the receiver/processor receives the information from the programmable radio wave signal transmitter and sends power to illuminate the array of red LED lights.

* * * * *